UNITED STATES PATENT OFFICE.

ARTHUR LIEBRECHT, OF FRANKFORT-ON-THE-MAIN, GERMANY, ASSIGNOR TO FARB-WERKE VORM. MEISTER LUCIUS & BRÜNING, OF HÖCHST-ON-THE-MAIN, GERMANY, A CORPORATION OF GERMANY.

ANTISEPTIC.

941,888.　　Specification of Letters Patent.　Patented Nov. 30, 1909.

No Drawing.　　Application filed August 6, 1908.　Serial No. 447,298.

*To all whom it may concern:*

Be it known that I, ARTHUR LIEBRECHT, Ph. D., a citizen of the Empire of Germany, residing at Frankfort-on-the-Main, Hesse-Nassau, Prussia, Germany, have invented certain new and useful Improvements in the Manufacture of Antiseptics, of which the following is a specification.

Tar-oils which substantially contain cresols can be rendered soluble in water by mixing them with certain substances such as soaps, glycerin, alkali salts of cresotinic acid, of phenanthrenesulfonic acid, etc. These methods of rendering the cresols soluble in water however fail with halogen derivatives of the cresols, as for instance chloro-ortho-cresol $1:2:3$ and $1:2:5$, chloro-p-cresol $1:2:4$ and $1:3:4$, bromo-p-cresol $1:3:4$, dibromo-p-cresol, tribromo-m-cresol, if it is necessary to dissolve these substances in such quantities as are required to render them capable of being used in therapeutics. Now it has been found that contrary to the above, solutions of 50% strength can be made from the mono-chloro derivatives of meta cresols corresponding to the formula: $C_6H_3.CH_3.OH.Cl=1:3:6$ by means of soaps *i.e.* as well of neutral soaps as of acid soaps or sulfonated soaps. These solutions are of particular value because they are disinfectants soluble in water and of a strong efficacy which very much surpasses that of the soap solutions of cresol and besides they have the advantage of being nearly odorless and they are also less poisonous in the required concentration, nor do they cause, like other soap solutions, the hands of the operative surgeon to get slippery.

Examples: (1.) 50 parts by weight of ricinolate of potassium in an 80% solution are well mixed up with 50 parts of chloro-meta-cresol $CH_3:OH:Cl=1:3:6$ while gently heating. The product is a uniform yellow odorless liquid which is soluble in water. (2.) 60 parts by weight of neutralized "sapo-kalinus" (linseed oil soap) (*Ph. G.* IV) are mixed with 40 parts of chloro-meta-cresol $CH_3:OH:Cl=1:3:6$ while being heated. The resulting slightly yellow homogeneous mass is soluble in water.

Having now described my invention, what I claim is:—

1. Process for manufacturing new antiseptics which consists in heating mono-chloro-m-cresol of the constitution $C_6H_3:CH_3:OH:Cl=1:3:6$ with soap solutions.

2. As new products, the highly concentrated soap solutions of the above mentioned mono-chloro-m-cresol, being a clear slightly colored liquid which can be mixed with water in any proportion and affords clear solutions with water in the proportions usually employed for antiseptic purposes.

In testimony whereof, I affix my signature in presence of two witnesses.

ARTHUR LIEBRECHT.

Witnesses:
　JEAN GRUND,
　CARL GRUND.